3,235,605
PREPARATION OF THIOPHENYLETHERS
John P. Napolitano, Royal Oak, Mich., assignor to Ethyl Corporation, New York, N.Y., a corporation of Virginia
No Drawing. Filed Mar. 1, 1963, Ser. No. 262,215
3 Claims. (Cl. 260—609)

This invention relates to a process for the preparation of thiophenylethers. More particularly, it relates to the S-alkylation of thiophenols with an olefinically unsaturated hydrocarbon.

Thiophenylethers as produced by this invention are useful as insecticides, and as intermediates in the preparation of insecticides by oxidation to the corresponding sulfoxides and sulfones.

In the past, thiophenylethers have been prepared in a number of ways. One method known to the art is the reaction of sodium thiophenoxide with an alkyl halide. A disadvantage of this method is that it requires expensive reactants. Further, the stearically bulkier alkyl halides will not react. Thus tert-butyl and tert-amyl thiophenylethers cannot be prepared by this method.

Another method is the reaction of thiophenol with an alkyl phosphate. Yields from this reaction are low and thus it is not a practical synthesis.

Still another method tried in the past is the uncatalyzed reaction of thiophenol with an olefin. This method requires long reaction times. Further the thiophenol adds to aliphatic olefins contrary to the mode of addition implied by Markownikoff's rule; that is the thiophenol does not add to the carbon atom with the smaller number of hydrogen atoms. Accordingly in the uncatalyzed reaction of thiophenol with isobutylene, isobutyl thiophenylether is formed, rather than the desired tert-butyl thiophenylether.

The catalyzed reaction of thiophenol with an olefin has also been tried, using either 75 percent sulfuric acid or a mixture of sulfuric and acetic acids. These reactions require expensive separation procedures and some olefins, such as isopropyl ethylene, undergo isomerization during alkylation of the thiol group, resulting in impure and undesirable products.

A need, therefore, exists for a process of S-alkylating thiophenol which is inexpensive and which results in high yields of product with a high degree of purity. Accordingly, it is an object of this invention to provide a process for the preparation of thiophenylethers from a thiophenol and an olefinically unsaturated hydrocarbon. It is a further object of this invention to provide a process whereby such thiophenylethers are prepared inexpensively, in high yields and with a high degree of purity. Another object of this invention is to provide a process in which a thiophenol adds to an olefinically unsaturated hydrocarbon according to the mode of Markownikoff's rule. Still another object is to provide such a process conducted in the presence of an aluminum salt of a phenoxide or of a thiophenoxide as a catalyst.

The above and other objects of this invention are accomplished by providing a process which comprises reacting a thiophenol with an organic compound possessing carbon-to-carbon unsaturation, in the presence of an aluminum salt of an aromatic compound selected from the group consisting of a thiophenol and a phenol.

Among the advantages obtained by utilizing the process of this invention are that a thiophenol can be added to that carbon atom of the olefinically unsaturated hydrocarbon containing the smaller number of hydrogen atoms, high yields are obtained with a minimum of reaction time and high purity of product is achieved. The process of this invention gives a direct route for the economical synthesis of many desirable chemicals.

The thiophenols used in the practice of this invention can be substituted on the phenyl ring or unsubstituted and can be represented by the formula

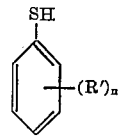

wherein $n$ is from 0 to 5 and each $R'$ is independently selected from halogen, $-OR''$, $-NH_2$, $-NO_2$, $-COOR''$, and $-R''$ where $R''$ is a hydrocarbon radical of from about 1 to about 12 carbon atoms. Such hydrocarbon groups include alkyl of from 1 to about 12 carbon atoms, alkaryl of from 7 to about 12 carbon atoms, aryl of from 6 to about 12 carbon atoms and cycloalkyl of from 5 to about 12 carbon atoms. Thiophenols that can be used in the practice of this invention include:

thiophenol itself,
2-methylthiophenol,
2-tert-butylthiophenol,
2-methyl-6-tert-butylthiophenol,
2,6-di-tert-butylthiophenol,
2,3,6-tri-tert-butylthiophenol,
2-isopropyl(thiophenyl)-2,6-diisopropylphenol,
2-(α,α-diethylbenzyl)thiophenol,
2,4,6-tri-(p-isobutylphenyl)thiophenol,
2,5-dibenzylthiophenol,
2,4,5,6-tetrafluoro-3-methylthiophenol,
2-n-heptyl-6-cyclopentylthiophenol,
2,6-bis(ethoxycarbonyl)thiophenol,
4-ethoxythiophenol,
4-n-dodecoxycarbonyl-2,6-di-n-octoxythiophenol,
2-(α-methyl-α-ethylbenzyl)-4,6-di-n-hexoxycarbonylthiophenol,
2-n-butyl-4-n-decoxythiophenol,
4-chlorothiophenol,
4-n-nonoxycarbonylthiophenol,
2,6-di-cyclohexylthiophenol,
4-(p-n-propylphenyl)thiophenol,
4-aminothiophenol,
2,6-di-(o-n-amylphenyl)-4-sec-butylthiophenol,
2-cycloheptyl-4-p-ethylphenylthiophenol,
2-methoxycarbonylthiophenol,
2-o-ethylphenylthiophenol,
2-methoxy-4-ethoxythiophenol,
2-(α,α-dimethylbenzyl)thiophenol,
4-n-undecoxythiophenol,
2,6-di-(p-methylphenyl)thiophenol,
2,6-di-(p-n-hexylcyclohexyl)thiophenol,
2,4,6-tri-sec-butylphenol,
2,4-bis-(n-dodecoxycarbonyl)thiophenol,
2,4,6-tri-(n-propoxycarbonyl)thiophenol,
2,4,6-tri-(p-ethylcyclohexyl)thiophenol,
2,6-dimethylthiophenol,
2-n-dodecylthiophenol,
2,4,6-trioctoxythiophenol,
2,6-di-n-decyl-4-valerylthiophenol,
4-nitrothiophenol,
2,4-di-bromothiophenol,
2,4,6-tri-(α-methyl-α-ethylbenzyl)thiophenol,
4-n-dodecyl-6-phenyl-thiophenol,
2-iodothiophenol,
2,6-di-(n-amyl-cyclohexyl)-4-nitrothiophenol,
4-n-hexylphenylthiophenol,
2,3,4-tricyclohexyl-6-p-isopropylhexylthiophenol,
2-n-nonyl-6-p-phenylphenylthiophenol and
2,6-di-n-pentoxythiophenol.

The unsaturated compound which is reacted with the thiophenol can be an acetylene, substituted acetylene, mono- or polyolefins (including mixtures of olefins), cycloolefins, aryl substituted olefins, and halogen substituted olefins. Other compounds bearing carbon-to-carbon double or triple bonds that can be used are unsaturated alcohols, amines, esters, ethers, and the like. Preferred organic compounds possessing carbon-to-carbon unsaturation are those having from 2 to about 20 carbon atoms. Of the various possible unsaturated compounds acetylene and olefinic hydrocarbons are preferred. Of the olefins those of lower molecular weight are preferred, as for example ethylene, propylene, the various butylenes, and the like up to olefins containing about 12 carbon atoms such as dodecene, although olefins of higher molecular weight up to and including those containing about 20 carbon atoms such as eicosene can also be used. Unsaturated compounds that can be used in the practice of this invention include: acetylene and substituted acetylene such as methyl acetylene, ethyl acetylene, and the like; mono- and non conjugated polyolefins such as ethylene, propylene, butylene, isobutylene, amylene, isoamylene, 2-methyl-amylene, hexene, heptene, heptadienes, octene, diisobutylene, decene, dodecene, hexadecene, octadecene, eicosene, styrene, 2 - phenylpropene - 1, 3 - phenyl propene - 1, 2-phenylbutene-1,3-phenylbutene-2, etc.; mixed olefins such as are obtained by polymerizing propylenes or butylenes by known methods, having from 8 to about 12 carbon atoms, as well as mixtures of other olefins; substituted olefins such as vinyl chloride, propargyl ethyl ether, vinyl ethyl ether, divinyl ether, methallyl ethyl ether, dimethallyl ether, methallyl phenyl ether, dihydropyran, propenyl acetate, methyl-β-methyl crotonate, pentene-4-ol-1, 4-methylpentene-4-ol-2, hexene-5-ol-1, decene-9-ol-1, dodecene-11-ol-1, cetene-15-ol-1, eicosene-19-ol-1, methyloleate, ethyloleate, ethyllinoleate, methallylamine, crotonylamine, 5-aminopentene-1, and the like.

The thiophenylethers preparable by the process of this invention include compounds having the formula

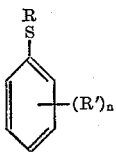

where R is selected from ethyl, isopropyl and secondary and tertiary hydrocarbon radicals of from 4 to about 20 carbon atoms, $n$ is from 0 to 5 and each R' is independently selected from halogen,

—OR", —NH$_2$, —NO$_2$, —COOR"

and R", where R" is a hydrocarbon radical of from 1 to about 12 carbon atoms.

The catalyst used in the process of this invention is the aluminum salt of an aromatic compound selected from the group consisting of a thiophenol, a phenol and mixtures thereof. When the aromatic compound is a thiophenol, it is preferred that it be, but need not be, the same as the thiophenol that is being S-alkylated. In general, the catalyst can be prepared from any of the thiophenols that can be used in the process as mentioned hereinabove.

When the catalyst is the aluminum salt of a phenol, the phenol can be phenol itself or phenol substituted on the ring with any of the substituents described as possible on the ring of the thiophenol that is being S-alkylated. In general, it is preferred that the aluminum salt of phenol itself be used or the aluminum salt of a simple ortho-alkylated phenol such as 2-methylphenol, 2-tert-butylphenol and 2-isopropylphenol.

The catalyst can be prepared, for example, by reacting the phenol, thiophenol or mixtures thereof directly with aluminum. The relative amounts of phenol, thiophenol and aluminum will determine the final composition of the catalyst. When there is more than a stoichiometric amount of phenol present with respect to the aluminum, the catalyst will be essentially all aluminum phenoxide. To obtain pure aluminum thiophenoxide phenol should be excluded.

Under anhydrous conditions three phenoxide or thiophenoxide groups are associated with the aluminum, but if water is present a hydroxy groups and two phenoxide or thiophenoxide groups may associate with the aluminum. For example, monohydroxy aluminum diphenoxide can be prepared from the reaction of one mole of aluminum, two moles of phenol and one mole of water. The extent of such an association with water will, of course, depend on the relative concentration of each constituent.

The catalyst can be preformed or prepared in situ. Thus aluminum can be added directly to the thiophenol to be S-alkylated and aluminum thiophenoxide will form. Likewise, aluminum can be added to phenol to form aluminum phenoxide. Mixtures of catalysts can be prepared by reacting stoichiometric amounts of aluminum, phenol and thiophenol. Mixtures can also be prepared by admixing the separate preformed catalysts.

The amount of catalyst used is dependent to some extent upon the pressure at which the reaction is conducted, the reactivity of the reagents, particular catalyst used and nature of the reaction system. At higher pressures somewhat smaller amounts of catalyst can be used than at lower pressures. Generally the amount of catalyst used should be between 0.01 and 50 percent by weight of the thiophenol present. In some instances where it is desired to S-alkylate thiophenol which is present in relatively small proportions in the reaction medium, a molar equivalent amount of catalyst relative to the thiophenol may be present; that is one mole of catalyst per three moles of thiophenol.

In conducting the processes of this invention it is convenient to add the unsaturated compound to a mixture of the thiophenol and catalyst. This is especially true with respect to the gaseous olefins such as isobutylene. With non-gaseous unsaturated compounds, the thiophenol and catalyst can be added thereto, and even with the gaseous olefins, methods may be devised to add the thiophenol and catalyst to the olefin. However, it is preferred in most cases to add the catalyst to the unsaturated compound.

The reaction can be carried out with or without a solvent. When a solvent or carrier is used, it can be either liquid or gaseous, depending primarily on the state of the reactant which is to be diluted at the time of introduction into the reaction vessel or zone.

In general, the process of this invention can be carried out at temperatures varying from 0 to about 500° C. and at pressures of from about 1 atmosphere to about 3 atmospheres and higher. The optimum temperature and pressure of a particular reaction depends on the reagents that are being reacted and the catalyst used. For example, when the unsaturated compound, intended for addition to the sulfur atom, has at least one hydrogen atom on each of the doubly bonded carbon atoms, temperatures ranging from about 120° C. to about 500° C. and pressures in the range of 1–3000 atmospheres are preferred. When using acetylenic and olefinic hydrocarbons such as acetylene, ethylene, propylene, butylene, hexene, decene, icosene, and the like especially preferred reaction temperatures are from about 100° C. to about 300° C. and reaction pressures of from about 1 atmosphere to about 500 atmospheres. However, higher temperatures and pressures can be used.

When at least one of the doubly bonded carbon atoms in the unsaturated compound has no hydrogen attached thereto, temperatures ranging from 0 to 500° C. and pressure from about 1–3000 atmospheres can be employed; for example when isobutylene is used to S-alkylate thiophenol in the presence of aluminum phenoxide. A preferred embodiment when reacting a thiophenol with an acetylenic or olefinic hydrocarbon in which at least one of the doubly or triply bonded carbon atoms has no hydrogen attached thereto, as for example, isobutylene, is to conduct the reaction at temperatures up to about 300° C. and pressures up to 500 atmospheres, although higher temperatures and pressure can also be used.

The following examples in which all parts are by weight illustrate this invention but are not intended as a restriction thereof.

*Example I*

A pressure resistant reaction vessel equipped with means for charging and discharging of liquids and solids and having a number of gas inlet and outlet lines, temperature measuring devices, means for refluxing liquids, and fitted with a mechanical agitator was charged with 4.5 parts of aluminum turnings and 466 parts of thiophenol. The vessel was sealed and heated to 171° C. with a resultant pressure of 80 atmospheres for 40 minutes, whereupon heating was discontinued. The reaction was allowed to continue without heat for about an additional hour until the temperature reached 64° C. whereupon the vessel was vented and flushed with nitrogen bringing the temperature of the contents down to 61° C.

The reaction vessel was sealed and isobutylene was added incrementally from a cylinder over a period of 68 minutes and reacted with the thiophenol at temperatures of from 73 to 140° C. and at a pressure range of from 25 to 180 atmospheres. An amount of isobutylene equivalent to a total pressure drop of 320 atmospheres reacted with the thiophenol. The mixture was removed from the reaction vessel and 360 parts of toluene were added. A small amount of water was added and the mixture was washed with dilute hydrochloric acid followed by two water washes. After drying by azeotropic distillation, the organic layer was distilled at reduced pressure through a helices packed column, yielding 604.7 parts of tert-butyl thiophenylether at 109.5–110.2° C. The tert-butyl thiophenylether had an index of refraction of 1.5330–3 $n_D^{20}$ which agreed with the reported value [J.A.C.S., 60, 2731 (1938)] of 1.5335 $n_D^{20}$. Based on the amount of charged thiophenol, the calculated conversion was 86.0 percent.

Further, good results are obtained when other thiophenols are reacted in a like manner with other unsaturated compounds in the presence of an aluminum thiophenoxide. Thus 2,5-dibenzylthiophenol can be reacted with butylene using aluminum 2,5-dibenzylthiophenoxide as a catalyst to yield isobutyl 2,5-dibenzylthiophenylether. Likewise, 2-cycloheptyl-4-p-ethylphenylthiophenol can be reacted with isoamylene using aluminum thiophenoxide as a catalyst to yield tert-amyl 2-cycloheptyl-4-p-ethylphenylthiophenylether. Also 4-nitrothiophenol can be reacted with n-heptene-1 using aluminum 4-nitrothiophenoxide to form (1-methyl-n-hexyl) 4-nitrothiophenylether.

*Example II*

A reaction vessel equipped with means for charging and discharging liquids and solids, having a number of gas inlet and outlet lines, temperature measuring devices, means for refluxing liquids, and fitted with a mechanical agitator, is flushed with nitrogen. While maintaining the flow of nitrogen, 300 parts of phenol are added. The temperature is raised to 165° C. and 4.5 parts of aluminum turnings are added in small increments. Agitation is maintained during the reaction which lasts for 15 minutes. When the reaction ceases the mixture is allowed to cool to about 60° C. and 300 parts of n-hexane are added. Aluminum triphenoxide precipitates, whereupon it is filtered, washed with n-hexane and dried.

A pressure resistant vessel having a removable cap for charging and discharging liquids and solids, equipped with a plurality of gas inlet and outlet lines, temperature measuring devices, pressure gauges, and fitted with a mechanical agitator, is flushed with nitrogen and charged with 584 parts of thiophenol, 33.1 parts of the aluminum phenoxide catalyst described above, and 26 parts of toluene as a solvent. S-alkylation is carried out at 65–85° C. and at a pressure of 3–9 atmospheres. An amount of isobutylene equivalent to the pressure drop of 19 atmospheres is reacted at the above temperatures and pressures to give tert-butyl thiophenylether in good yield.

The process of this invention can also be used to obtain other products, among which are: tert-butyl 2,4-dimethylthiophenylether which can be obtained by the reaction of 2,4-dimethylthiophenol with isobutylene in the presence of aluminum 2,4-dimethyl phenoxide at a temperature of 300° C. and a pressure of 500 atmospheres; tert-butyl 4-methylthiophenylether which can be obtained from the reaction of p-methylthiophenol with isobutylene in the presence of 0.01 percent by weight of aluminum p-methyl phenoxide; tert-butyl 4-(N-amylamino) thiophenylether which can be obtained from the reaction of 4-(N-amylamino) thiophenol with isobutylene in the presence of aluminum phenoxide; tert-butyl 4-chlorothiophenylether which can be obtained by the reaction of p-chlorothiophenol with isobutylene in the presence of 50 percent by weight of aluminum p-chlorophenoxide; tert-butyl 3-bromo thiophenylether which can be obtained by the reaction of m-bromothiophenyl with isobutylene in the presence of an aluminum phenoxide catalyst, and a tert-butyl 2-amino-4-halothiophenylether which can be obtained by the reaction of a 2-amino-4-halothiophenol with isobutylene in the presence of an aluminum phenoxide catalyst such as an aluminum 2-amino-4-halophenoxide.

Other products which can be obtained by the use of other unsaturated compounds such as 2-methylbutene-1, 2-ethylbutene-1, 2-methylpentene-1, and the like, as well as other thiophenols such as 2-nitro-thiophenol, 2-methoxythiophenol, etc., will be apparent to one skilled in the art.

*Example III*

The pressure resistant vessel of Example I is flushed with nitrogen and charged with 600 parts of thiophenol and 55.0 parts of an equal mixture of aluminum phenoxide and aluminum thiophenoxide catalyst. The vessel is clamped shut and the flow of nitrogen discontinued. The reaction vessel is heated to 200° C. and pressurized to 21 atmospheres with ethylene. The reaction mixture is further heated to a temperature of 280° C. A pressure drop indicates the commencement of the reaction. As the reaction proceeds, more ethylene is admitted to keep the pressure in the vessel within the range of 40–55 atmospheres. The above conditions are maintained for 10 hours, at the end of which time, heating is discontinued and the pressure resistant vessel and its contents are allowed to cool. When the temperature reaches 25° C., 250 parts of water are added to hydrolyze the catalyst. The contents are withdrawn from the reaction vessel and the aqueous layer is discarded. The product is filtered and dried by azeotropic distillation to give, by distillation, ethyl thiophenylether in good yield.

Further good results are obtained when other thiophenols are similarly reacted with ethylene or other organic compounds possessing carbon-to-carbon unsaturation in the presence of a mixture of aluminum thiophenoxide and aluminum phenoxide. For example, o-chlorothiophenol can be reacted with ethylene in the presence of a 3:1 mixture of aluminum o-chlorothiophenoxide and aluminum o-chlorophenoxide at a temperature of 120° C. and a pressure of 500 atmospheres to ethyl 2-chlorothiophenylether in good yield. Likewise, m-fluorothiophenol can be reacted with butene-1 in the presence of a 3:1 mixture of aluminum m-fluorophenoxide and aluminum m-fluorothiophenoxide to give (2-butyl) 3-fluorothiophenylether. Similarly 3,5-dimethylthiophenol can be reacted with allyl amine in the presence of a 9:1 mixture of aluminum, 3,5-dimethylphenoxide and aluminum 3,5-dimethylthiophenoxide to produce (1-methyl-2-aminoethyl) 3,5-dimethylthiophenylether. Other examples of products that can be formed by this process will be apparent to one skilled in the art.

*Example IV*

The pressure resistant vessel of Example I containing a mixture of 600 parts of toluene, 55.0 parts of thiophenol, and 51.0 parts of aluminum phenoxide is flushed with nitrogen and sealed. Isobutylene is added incrementally while the mixture is heated to a temperature of 140° C. for 80 minutes. The reaction mixture is hydrolyzed with water, washed with dilute hydrochloric acid, filtered and dried by azeotropic distillation. The organic layer is distilled under reduced pressure through a helices packed column giving tert-butyl thiophenylether in good yield.

Further, good reuslts are obtained when other thiophenols are similarly reacted with an organic compound containing carbon-to-carbon unsaturation in the presence of an aluminum phenoxide catalyst. For example 2-methylbutene-1 can be reacted with 2-methoxyphenol in the presence of aluminum phenoxide with *n*-hexane as a solvent to yield (1,1-dimethylpropyl) 2-methoxythiophenylether. Likewise, 2,4-dimethylthiophenol can be reacted with diisobutylene in the presence of a solvent and an aluminum phenoxide catalyst to yield (1,1,3,3-tetramethylbutyl) 2,4 - dimethylthiophenylether. Similarly, p-methylthiophenol can be reacted with cyclohexene in the presence of alumnium p-cresoxide to give cyclohexyl p-methylthiophenylether. Also decene-1 can be reacted with a p-halo thiophenol in the presence of an aluminum p-halophenoxide and a solvent to yield a (1-methylnonyl) p-halothiophenylether. Likewise, methallyl-methyl-ether can be reacted with thiophenol in the presence of aluminumphenoxide to yield (1,1-dimethyl-2-methoxy ethyl) thiophenylether. Other possible products that can be obtained will be apparent to one skilled in the art.

Non-limiting examples of products that can be obtained by my process in addition to those given hereinabove are: phenyl-vinyl-sulfide and 1,1-bis(phenylthio) ethane, obtained by the reaction of thiophenol with acetylene in the presence of an aluminum phenoxide; ethyl 3-methylthiophenylether obtained by the reaction of 3-methylthiophenol with ethylene is the presence of an aluminum thiophenoxide catalyst such as aluminum 3-methylthiophenoxide; ispropyl 2 - tert - butylthiophenylether obtained by the reaction of 2-tert-butylthiophenol with propylene in the presence of aluminum 2-methylphenoxide; (2-eicosyl) thiophenylether obtained by the reaction of thiophenol with eicosene-1 in the presence of aluminum phenoxide; (1-methyl - 3 - hydroxyethyl) thiophenylether obtained by the reaction of thiophenol with pentene-4 - ol - 1 in the presence of aluminum thiophenoxide; (1,1-dimethyl-2-ethoxyethyl) thiophenylether obtained by the reaction of thiophenol with methyl ethyl ether in the presence of aluminum phenoxide; and (1,1-dimethyl-2-amino ethyl) thiophenylether obtained by the reaction of thiophenol with methallyl amine in the presence of aluminum phenoxide.

I claim:
1. A process for preparing a thiophenyl ether having the formula:

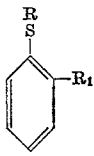

wherein R is selected from ethyl, isopropyl and secondary and tertiary alkyl radicals of from 4 to about 12 carbon atoms and $R_1$ is selected from the group consisting of hydrogen and alkyl radical of from 1–12 carbon atoms which comprises reacting a thiophenol haping the formula:

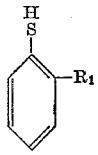

with an alkene of from 2–12 carbon atoms in the presence of an aluminum phenoxide as a catalyst.

2. The process of claim 1 wherein R is a tertiary butyl radical and said alkene is isobutylene.

3. The process of claim 2 wherein $R_1$ is hydrogen.

References Cited by the Examiner
UNITED STATES PATENTS 2,081,766   5/1937   Reppe et al. _____ 260—609

FOREIGN PATENTS 1,110,631   7/1961   Germany.

CHARLES B. PARKER, *Primary Examiner.*
DANIEL D. HORWITZ, *Examiner.*